United States Patent [19]

Comfort et al.

[11] 4,394,728

[45] Jul. 19, 1983

[54] ALLOCATION CONTROLLER PROVIDING FOR ACCESS OF MULTIPLE COMMON RESOURCES BY A DUPLEX PLURALITY OF CENTRAL PROCESSING UNITS

[75] Inventors: Joseph A. Comfort; Thomas J. Perry; Michel Loos, all of Phoenix, Ariz.

[73] Assignee: GTE Automatic Electric Labs Inc., Northlake, Ill.

[21] Appl. No.: 163,047

[22] Filed: Jun. 26, 1980

[51] Int. Cl.³ .................... G06F 13/00; G06F 13/06
[52] U.S. Cl. .................................... 364/200; 364/900
[58] Field of Search ... 364/200 MS File, 900 MS File, 364/187, 200; 371/9

[56] References Cited

U.S. PATENT DOCUMENTS

| | | | |
|---|---|---|---|
| 3,303,474 | 2/1967 | Moore et al. | 371/9 X |
| 3,444,528 | 5/1969 | Lovell et al. | 371/9 |
| 3,521,238 | 7/1970 | Gunderson | 364/200 |
| 3,636,331 | 1/1972 | Amrehn | 364/187 |
| 3,699,529 | 10/1972 | Beyers et al. | 364/200 |
| 3,806,885 | 4/1974 | Moore | 364/200 |
| 3,882,455 | 5/1975 | Heck et al. | 371/9 |
| 4,065,809 | 12/1977 | Matsumoto | 364/200 |
| 4,096,571 | 6/1978 | Vander Mey | 364/200 |
| 4,133,027 | 1/1979 | Hogan | 364/187 |
| 4,141,066 | 2/1979 | Keiles | 364/187 X |
| 4,159,518 | 6/1979 | Draper et al. | 364/200 |
| 4,164,787 | 8/1979 | Aranguren | 364/200 |
| 4,171,536 | 10/1979 | Hever et al. | 364/200 |
| 4,191,996 | 3/1980 | Chesley | 371/9 |

FOREIGN PATENT DOCUMENTS

| | | | |
|---|---|---|---|
| 54-159839 | 12/1979 | Japan | 371/9 |
| 2032149 | 4/1980 | United Kingdom | 371/9 |

*Primary Examiner*—Mark E. Nusbaum
*Assistant Examiner*—William G. Niessen
*Attorney, Agent, or Firm*—Robert J. Black; Frank J. Bogacz

[57] ABSTRACT

An allocation controller providing for equal priority sharing of duplicate copy multiple resources by a duplex plurality of central processing units. Conflicts resulting from simultaneous requests from several CPUs for access to one of the common resources are resolved at a high rate of speed. In addition, an approximately statistically equal probability is maintained for access of the common resource by all the central processing units.

19 Claims, 6 Drawing Figures

ALLOCATION CONTROLLER PROVIDING FOR ACCESS OF MULTIPLE COMMON RESOURCES BY A DUPLEX PLURALITY OF CENTRAL PROCESSING UNITS

CROSS-REFERENCE TO RELATED APPLICATIONS

The present application is related to co-pending U.S. patent applications Ser. Nos. 163,044; 163,045; 163,046; 163,048 and 163,049, all assigned to the same assignee.

BACKGROUND OF THE INVENTION

(1) Field of the Invention

The present invention pertains to multicentral processing unit controlled real time systems and more particularly to an allocation scheme for resolving conflicting requests from a plurality of duplex central processing units for access to multiple commonly shared resources.

(2) Description of the Prior Art

Computer control has been applied to a vast number of real time process control systems. For example, central processing units (CPUs) control the real time switching operation in modern telephone central offices. Historically, large CPUs have been developed to provide the control function for large telephone central offices.

Due to the public policy of requiring telephone switching centers to operate 24 hours a day continuously without disruption of service, highly reliable switching systems are desirable. This requirement provides added complexity when dealing with CPU common controlled switching systems.

In more recent times, large central processing units have given way to distributed processing schemes. In such schemes, numbers of smaller central processing units cooperate to perform the control functions, thereby increasing the overall flexibility of such a system and providing for modular expansion. In the telephone central office example, many smaller central processor units working together can handle telephone traffic more efficiently and economically than a single large central processing unit. Microprocessor CPUs are specially suited to such an operation.

In distributed processing systems where there are a number of central processing units, CPUs may typically exchange information in order to perform one overall task. One solution to the information exchange problem is to have two CPUs talk directly to one another. In such a configuration, each CPU must stop any other tasks which it may be performing, establish a direct link via a defined protocol scheme and then transmit the required information.

In another solution, the CPUs may asynchronously place information in a predefined resource, so that the CPU which is to receive the information may remove it at its own particular available time. In sharing a common resource, a problem of allocation of the resource to a particular CPU arises. That is, a number of CPUs may request to deposit or retrieve information simultaneously. Therefore, conflicts in accessing the resource arise and these conflicts of access must be resolved. Previous access schemes involved scanning signals for request or allocating certain time slots in which each processor may access the resource. Such systems are time consuming and inefficient and further they allow monopolization of the resource by a particular CPU of the group.

Accordingly, it is an object of the present invention to provide an allocation controller for providing equal priority sharing of multiple common resources by a duplex plurality of CPUs.

It is a further important objective of the present invention to provide such a controller which prohibits monopolization of any common resource by a particular CPU.

It is another important objective of the present invention to provide for the arbitration of simultaneous access by CPUs at a very rapid rate in order to allow an efficient information exchange.

It is another important objective of the present invention to provide for an approximately statistically equal probability of each CPU for obtaining access to the resource.

It is still another important objective of the present invention to provide for a highly reliable configuration for CPU arbitration in order to prevent switching system disruption due to equipment failure.

It is another important objective of the present invention to provide an allocation controller which may grow in the number of CPUs, which are subject to control, in an efficient and economical manner.

SUMMARY OF THE INVENTION

The present invention comprises an allocation controller providing for equal priority sharing of multiple duplicate copy resources by a duplex plurality of CPUs. These CPUs communicate with one another by transmitting information asynchronously to the common resource and retrieving information deposited therein by the other CPUs. One resource, comprising two identical copies, can operate with only one CPU at one time. Due to the large number of CPUs employed and physical limitations, the CPUs are arranged in three groups. Each CPU group has a memory unit primarily associated with it. Primarily, a CPU communicates with the memory unit in its group, but any CPU may transfer data to any memory unit. Thereby, conflicts arise between CPUs within a group and also between CPUs of differing groups. These conflicts are resolved at three different levels. Two levels of conflict are resolved within a group and another level resolves inter-group conflicts.

Each active CPU of a duplex pair is connected to a corresponding duplex pair of aribtration circuits (first level of conflict resolution) and the connections between each CPU and its corresponding duplex pair of arbitration circuits each comprises a tri-state bus arrangement. Each first level arbitration circuit is connected to a group resource via a common tri-state bus. A second level of conflict is resolved within the group in order to allocate control of both copies of a resource to one processor within the group.

Duplex circuits for second level conflict resolution (third level of conflict resolution), are connected to the duplex first arbitration circuits and the second arbitration circuits are connected to the duplicate copy resources of the group via tri-state buses. Each second arbitration circuit of is further connected to the second arbitration circuit of each of the other groups thereby forming two duplex ring connections of the second arbitration circuits for the transmission of data and control.

Due to the large number of CPUs in the configuration, each group of duplex CPUs and corresponding first level arbitration circuit is divided into two subgroups. As a result there are three groups each having two subgroups for a total of six subgroups. The first level of conflict resolution is controlled within the subgroup by the first level arbitration circuits. In each subgroup, each first level arbitration circuit is connected to the next successive first level arbitration circuit, with the last first level arbitration circuit being connected to the first, thereby forming two duplex ring connections for each of the two subgroups of first level arbitration circuits. An initialization signal is applied to the initial first level arbitration circuit of each duplex pair of each subgroup and a bus available signal is derived from it and is propagated along each ring connection in a circular of fashion.

When a CPU requests an access to a duplicate pair of resources, a signal is transmitted via the tri-state bus between the active CPU of the pair and the duplex pair of first level arbitration circuit. Since the bus available signal moves along each subgroup's completed ring connection at a high rate of speed, in a very short time the bus available signal will enter the logic of the synchronously operating first lead arbitration circuits corresponding to the CPU which has made the common resource request. The signals are analyzed by the arbitration circuits and transmitted to synchronously operating subgroup switching circuit. Since one CPU has requested resource access, these switching circuits will automatically enable the requesting CPU to access the tri-state buses connected to each copy of the duplicated resource. The CPU then proceeds with the information exchange and other CPUs must wait.

When two or more CPUs of one subgroup simultaneously request access to the duplicated common resources, the next CPU which has an active common resource request and sequentially obtains the bus available signal will gain control of the common resource. The bus available signal travels at a high rate of speed slowed only by a single gate propagation time, if no requests for the common resources are active. The probability of any CPU gaining access to the common resource is statistically equal to that of any other CPU. Each CPU is allowed only one access cycle to the common resource and then must relinquish control of the resource. In this way, one CPU is prohibited from monopolizing the resource for a long period of time.

When two CPUs located in the different subgroups simultaneously request access to the common resources, the arbitration of this conflict is resolved by the synchronous pair of subgroup switching circuit of each group. The essence of this subgroup switching circuits is to operate when CPUs in two different subgroups simultaneously request access to the same resource, to choose one or the other CPUs for connection to the duplicate resources. The subgroup switching circuit alternates its selection at a high rate of speed so the choice is nearly random. If only one CPU requests, the switching circuits need not choose and simply allocate the resources to the CPU. When the circuits must choose, the periodic pulses of an input clock signal provide the selection of which subgroup has first access. Access is then alternately allocated.

After the completion of one access cycle to the duplicate copy common resources, the other CPUs of each subgroup will sequentially be granted the access to the resource. If other CPUs have active requests, they will be serviced in a sequential fashion similar to that as described above.

While one CPU of one subgroup is accessing a duplicated resource, and if no other CPUs of that subgroup have active resource request signals, the bus available signal will propagate along the ring connection of each group and back to the CPU which is currently accessing a duplicated resource. The propagation of the bus available signal will not be halted, because other resource request signals in each subgroup may have become active in the intervening propagation time. Therefore, each of the pair of first level arbitration circuits will re-propagate its bus available signal, so that the next active resource request signal of each subgroup can be established simultaneously with the processing of the current resource access. In addition, this scheme of re-propagating the bus available signal prevents a particular CPU from making two consecutive resource accesses.

In each subgroup if the bus available signal returns to the pair of first level arbitration circuits making the resource access, a take grant signal is generated to automatically allow the next sequential first level arbitration circuit pair of each subgroup to access a duplicate resource, if it has an active request. This take grant signal is important when no other CPUs have an active request because it prevents one arbitration circuit pair from multiple consecutive accesses and distributes determination of which is the next available resource request in the subgroup to be given access on a rotational basis. This scheme keeps resource access equal when CPU requests are few and sporadic.

Optionally, each first level arbitration circuit pair of each subgroup provides its associated CPU with the ability to hold the access of the resource for more than one cycle.

Each CPU of the plurality has an associated ready-standby CPU. Only one of the duplex pair is active at one time. The other CPU is ready to become active should a fault occur in the active CPU. Both CPUs of the duplex pair have full access to each copy of the resource via cross connection of the tri-state buses between the CPUs and the two parallel rings of arbitration circuits.

Operation of each arbitration group and each copy of the resource are synchronized, so that the integrity of information stored or retrieved from memory is maintained.

Conflicts within a group are resolved via the first level arbitration circuits and subgroup switching circuits located in each group. When a conflict arises between CPUs of different groups, a third level of conflict resolution is required. Second level arbitration circuits provide this required control. Each group has a pair of synchronously operated second level arbitration circuits which are each connected to a corresponding second level arbitration circuit of the next sequential group, with the last group's second level arbitration circuits connected to the first group's second level arbitration circuits.

At a particular time each CPU group has only one CPU selected for an access to a particular pair of duplicated resources. When more than one group has an active resource request, this conflict is resolved by means of the interconnections of the synchronously operated second level arbitration circuits. These interconnections form two synchronous ring connections analogous to the ring connections of each subgroup of first level arbitration. An input signal is transmitted to the initial second level arbitration circuit of each ring connection. This signal indicates which CPU group corresponding to a second level arbitration circuit has highest priority, which group has intermediate priority and which group has lowest priority. The priority assignment rotates upon every cycle of the system's clock.

The CPU group having highest priority has control of all the system's buses and can access the duplicate resources of its own group or that of any of the other groups. The access occurs and all other CPUs must wait. At the next cycle of the system clock, the group which had been intermediate priority becomes highest priority, the group which was lowest priority becomes intermediate priority and the group which was highest priority becomes lowest priority, etc. This rotation of priority occurs at each clock cycle at a high rate of speed, so that the control for accessing the resources is equally shared among the CPU groups.

In the above manner, the conflicts among CPUs for access to the duplicate resources, are resolved first, within the subgroup via the first arbitration circuits, second between subgroups of a particular group via the subgroup switching circuit and third between groups via the second arbitration circuits.

DESCRIPTION OF THE DRAWINGS

FIG. 1 is to be taken together with FIGS. 2A & 2B.

FIGS. 2A and 2B are to be placed side by side with FIG. 2A on the left and FIG. 2B on the right.

DESCRIPTION OF THE PREFERRED EMBODIMENT

Figure 1:
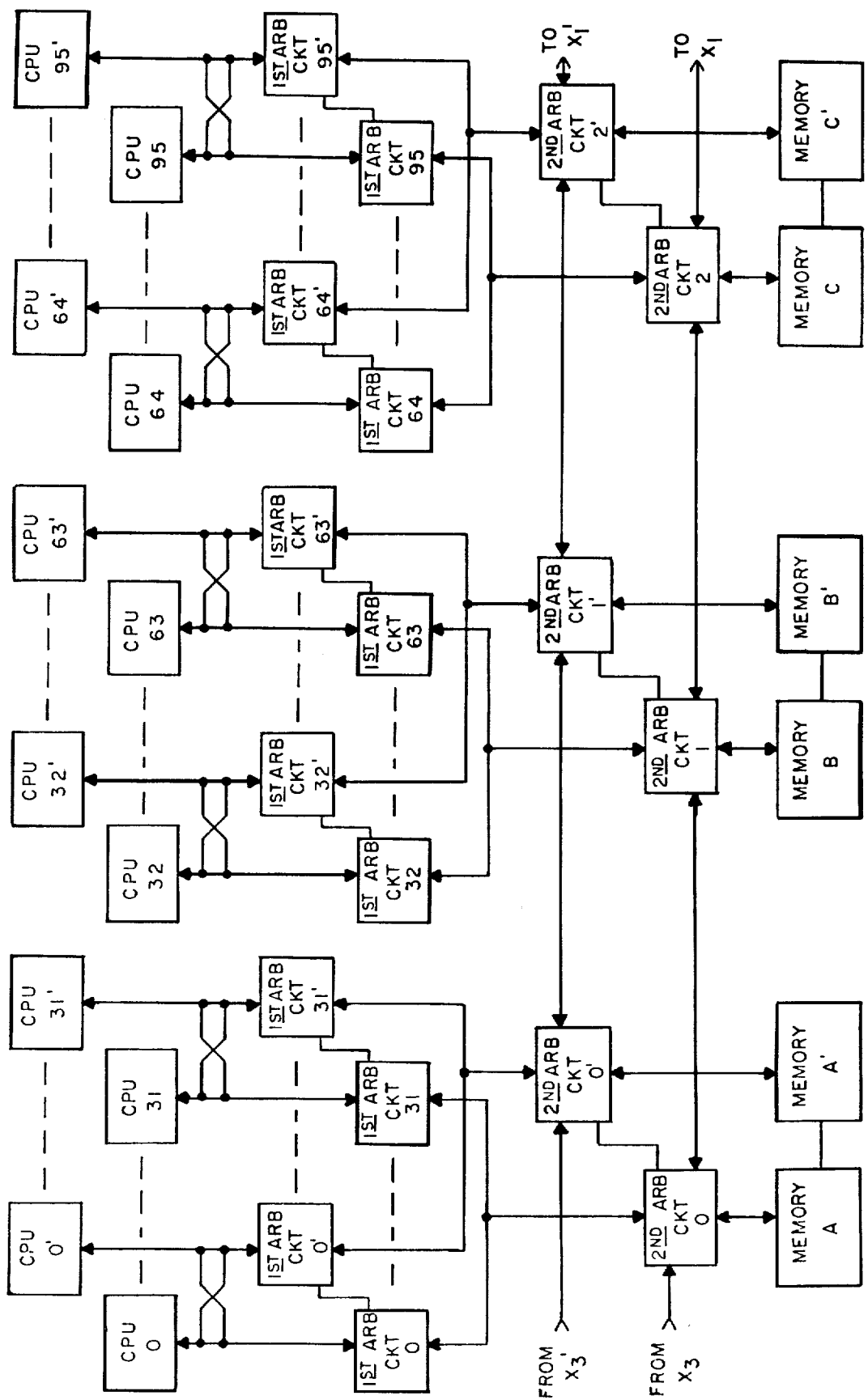
FIG. 1 is a block diagram of an allocation controller providing for access of multiple common resources by a duplex plurality of central processing units.

Referring to FIG. 1, a block diagram of an allocation controller providing for access of multiple common resources by a duplex plurality of central processing units (CPUs) is shown. The present application teaches duplex allocation control. Simplex allocation control is taught in co-pending sister application serial number 163,048.

Three CPU groups each including duplicated memory units are shown (group A comprising CPUs 0–31 and 0'–31' and memories A and A'; group B comprising CPUs 32–63 and 32'–63' and memories B and B'; and group C comprising CPUs 64–95 and 64'–95' and memories C and C'). CPUs 0 and 0', 1 and 1', etc. constitute duplex pairs having one CPU of the pair active and the other a ready-standby for fault failure of the active one. Each CPU of the pair has its buses cross-connected to the other first level arbitration circuit of the duplex pair. The duplex pair of arbitration circuits operate synchronously. (That is, CPU 0 is connected via buses to arbitration circuits 0 and 0', CPU 0' is connected via buses to arbitration circuits 0' and 0. CPU 1 is connected to arbitration circuits 1 and 1', CPU 1' is connected to arbitration circuits 1' and 1, etc.) However, only one CPU of the pair is active at one time. The buses are enabled only from the active CPU via tri-state driver elements. Each central processing unit is connected via a tri-state bus to a first level arbitration circuit, that is, CPU 0 is connected via tri-state bus in the first level arbitration circuit 0 and CPU 0' is connected via a tri-state bus to first level arbitration circuit 0'. First level arbitration circuits 0–31, 32–63 and 64–95 of each group are further connected via tri-state buses through a subgroup switching circuit per group (not shown) to second level arbitration circuits 0, 1 and 2 respectively and first level arbitration circuits 0'–31', 32'–68' and 64'–95' are connected via tri-state buses through another subgroup switching circuit per group (not shown) to second level arbitration circuits 0', 1' and 2' respectively. Each second level arbitration circuit is connected to a corresponding group memory unit A, A', B, B', C or C'.

Second level arbitration circuit 0 is connected via tri-state bus arrangement to second level arbitration circuit 1 and second level arbitration circuit 1 is connected to second level arbitration circuit 2 which in turn is connected to second level arbitration 0 and similarly second level arbitration circuits 0', 1' and 2' are connected to one another. Second level arbitration circuits 0 and 0', 1 and 1' and 2 and 2' constitute duplex pairs and each pair is interconnected for synchronous operation. Each second level arbitration circuit is connected via tri-state bus to a corresponding memory (arb. ckt. 0 to memory A; arb. ckt. 0' to memory A'; arb. ckt. 1 to memory B; arb. ckt. 1' to memory B'; arb. ckt. 2 to memory C; and arb. ckt. 2' to memory C'). Thereby, any CPU is allowed access to any duplicated copy memory A and A', B and B', or C and C'.

An example will serve to illustrate. CPU 0 makes a memory access request to memory unit A. First level arbitration circuits 0–31 and 0'–31' determine that CPU 0 is to be given priority, since its the only active request in group A. A signal is transmitted between each subgroup of first level arbitration circuits within a group. This signal grants priority of access from each subgroup on a rotational basis among its respective CPUs. Next, CPU 0 request is gated through group A' subgroup duplex switching circuits to the second level arbitration circuits 0 and 0'. A signal is transmitted along the ring connection of second level arbitration circuits 0-2 and 0'-2'. At each cycle of the system clock the second level arbitration circuits have an ordered priority of access to the memories A-C. For example, at a particular clock cycle second level arbitration circuits 0 and 0' will have the highest priority, second level arbitration circuits 1 and 1' have next priority and second level arbitration circuits 2 and 2' have lowest priority. Control of the memories is always allocated to the group having highest priority. At each clock cycle the priority of each group is changed on a rotational basis. That is, the second level arbitration circuit which was next priority now becomes highest priority, the lowest priority becomes next priority and the previous highest priority becomes the lowest priority.

The second level arbitration circuits having highest priority will allocate control for one clock cycle of the memory to the requesting CPU which has been connected via the tri-state busing arrangements to the particular second level arbitration circuits. Next, the duplicated memory access occurs (both copies of memory are read from or written). On the next clock cycle the priority between second level aribtration circuits change and another CPU has control to access any memory unit A-C.

When two or more CPUs within a group request memory access the resolution of this conflict is accomplished as described below. When two or more CPUs in different groups request access to any of the memories, the group whose second level arbitration circuits have highest priority is allowed access first. The second level arbitration circuit which is presently of highest priority is able to access any memory unit A-C via the tri-state buses. In this way information can be exchanged between any two processing units such as CPU 0 and CPU 95.

Each duplex pair of second level arbitration circuits become highest priority in a sequential fashion. The operation of the elements within a CPU group will be discussed for one group and it should be understood that all three duplexed groups function similarly.

Figure 2A:
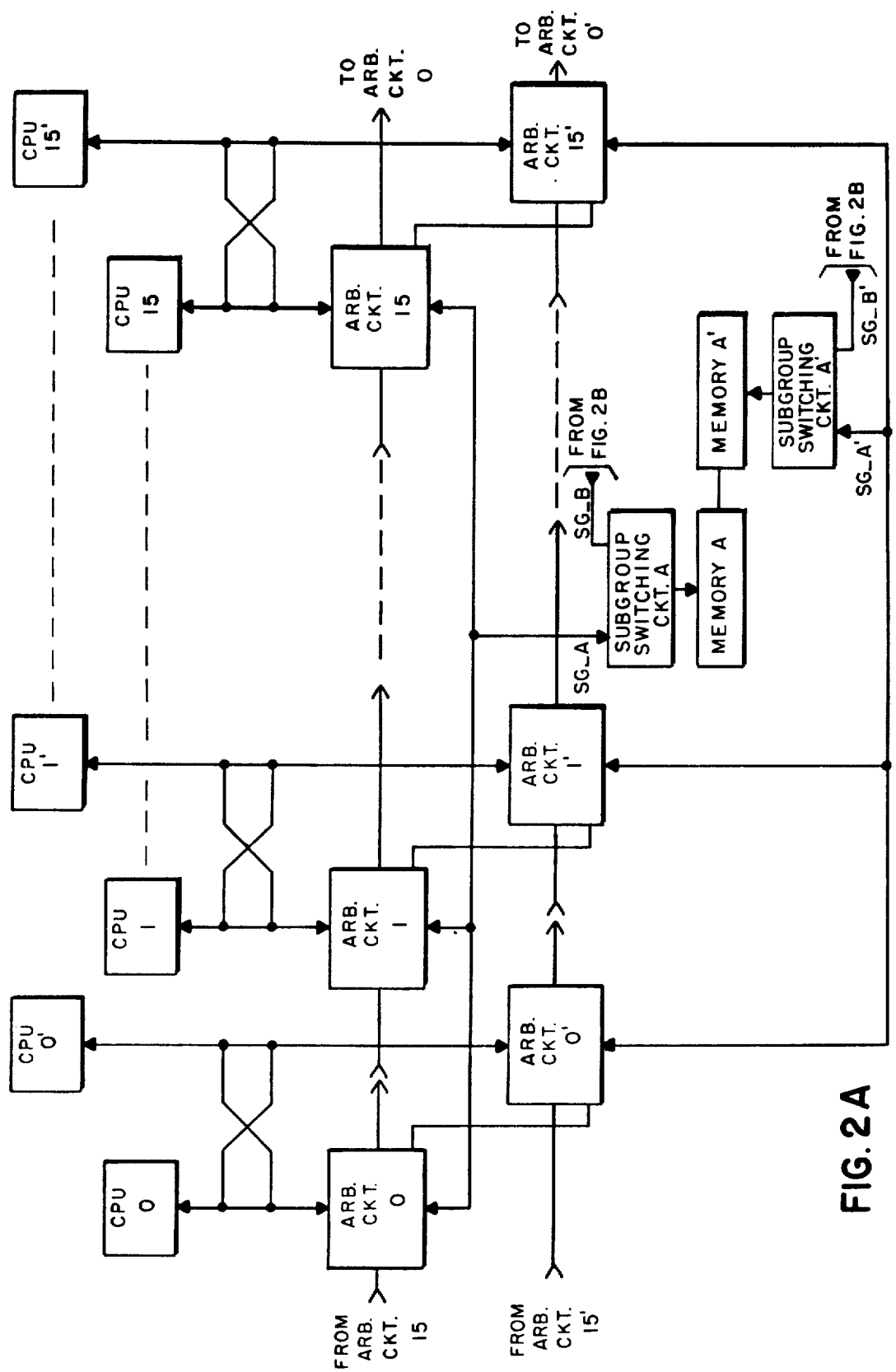
FIGS. 2A and 2B comprise a block diagram of arbitration control for a particular group of duplex CPUs as shown in FIG. 1 without depicting the second level arbitration circuits shown in FIG. 1.
Figure 2B:
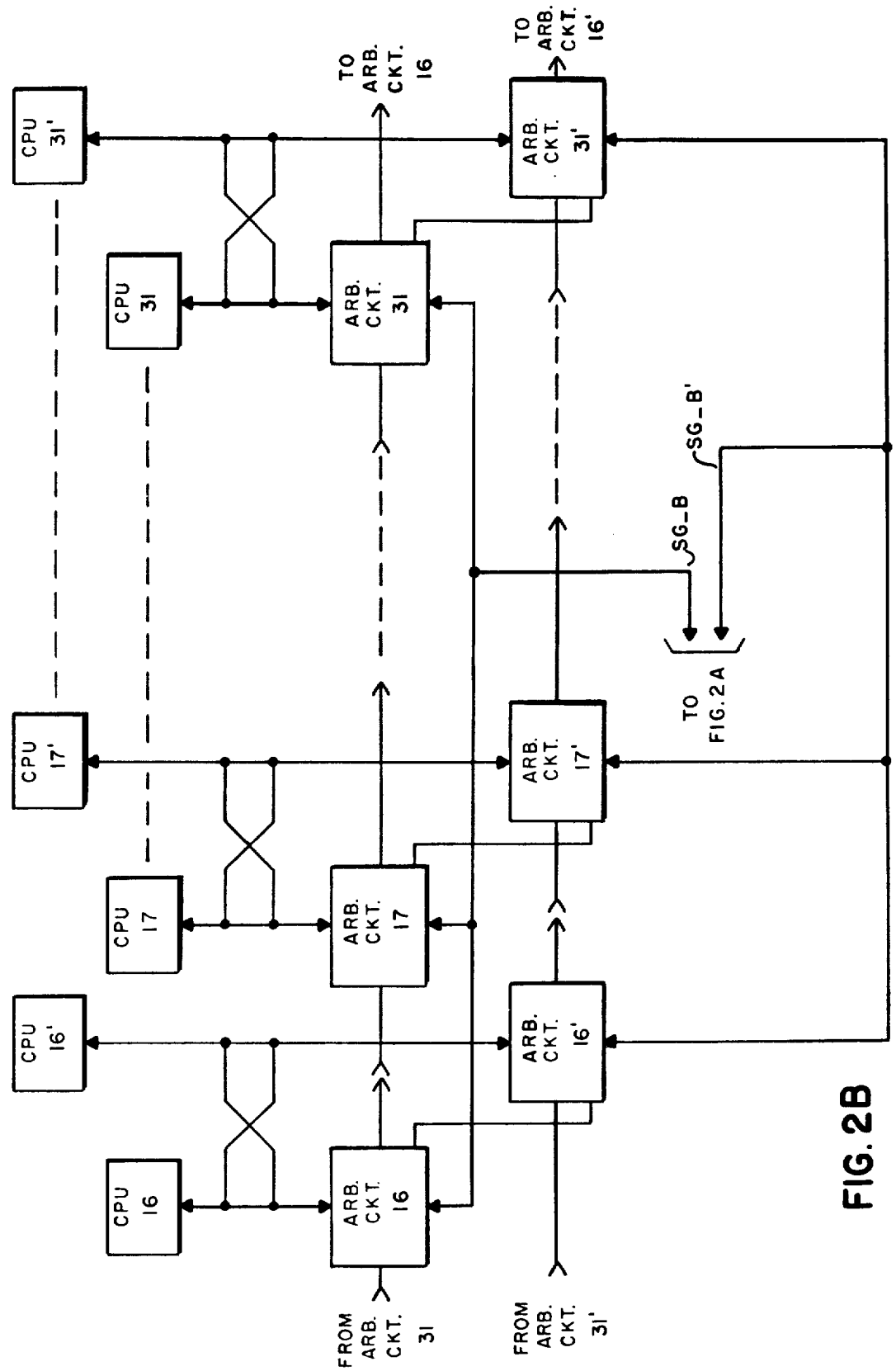

Referring to FIGS. 2A and 2B, each central processing unit (CPU) 0-15, 0'-15', 16-31 and 16'-31' is shown connected via a tri-state bus to a corresponding first level arbitration circuit 0-15, 0'-15', 16-31 and 16'-31'. Due to physical constraints, CPUs 0-15 and 0'-15' comprise one subgroup and CPUs 16-31 and 16'-31' comprise another subgroup.

Each arbitration circuit 0-15, 0'-15', 16-31 and 16' is in turn connected via a tri-state bus and second level arbitration circuits 0 and 0' (not shown) to memories A and A' via subgroup switching circuits A and A'.

First level arbitration circuit 0 is connected to first level arbitration circuit 1 with arbitration circuit 1 being connected to the last first level arbitration circuit 15 of the subgroup and the last arbitration circuit connected back again to arbitration circuit 0, thereby forming a completed ring connection. First level arbitration circuit 0' is connected to first level arbitration circuit 1' with arbitration circuit 1' being connected to the last first level arbitration circuit 15' of the subgroup and the last arbitration circuit 15' connected back again to arbitration circuit 0', thereby forming a second parallel and synchronously operated ring connection. First level arbitration circuit 16 is connected to first level arbitration circuit 17 with arbitration circuit 17 being connected to the last first level arbitration circuit 31 of the subgroup and the last arbitration circuit 31 connected back again to arbitration circuit 16. First level arbitration circuit 16' is connected to first level arbitration circuit 17' with arbitration circuit 17' being connected to the last first level arbitration circuit 31' of the sugroup and the last arbitration circuit 31' connected back again to arbitration circuit 16', thereby forming two parallel and synchronously operated ring connections. There is an exact correspondence between each group of arbitration circuits. The number of arbitration circuits of each ring connection is in direct relation to the number of CPUs in the configuration.

The configuration of each group may contain as many as 32 pairs central processing units (each may comprise an INTEL 8086 or similar device) and therefore, 32 arbitration circuits. The number of CPUs is expandable from 2 pairs to a total of 32 pairs in this implementation. As a practical matter, at least two pairs of CPUs one from each subgroup are required for the function of telephone central office switching.

When an initialization signal is applied to first level arbitration circuits 0, 0', 16 and 16', four bus available signals are derived and propagated along to each successive first level arbitration circuit in each ring connection of each subgroup ultimately returning to arbitration circuits 0, 0', 16 and 16' where they are again propagated. When for example, CPU 0 requests access to memory A and A', first level arbitration circuits 0 and 0' receive a request signal via its bus. And as these bus available signals are propagating through the logic of first level arbitration circuits 0 and 0', arbitration circuits 0 and 0' will temporarily block the propagation of the bus available signals. Since only CPU 0 is active, CPU 0 will have its request transmitted through both subgroup switching circuits A and A' and second level arbitration circuits 0 and 0' (not shown) and will obtain control of the common bus between the second level arbitration circuits and memory A and A'. CPU 0 then simultaneously performs a memory access of memories A and A' of a duration of one memory cycle while simultaneously re-propagating the bus available signal to the next sequential first level arbitration circuit pair 1 and 1'. The operation is analogous for CPU 16 accessing memories A and A' via first level arbitration circuits 16 and 16', subgroup switching circuits A and A' and second level arbitration circuits 0 and 0'.

The bus available signal travels along each the ring connection of arbitration circuits 0-15, 0'-15', 16-31 and 16'-31' at a relatively high rate of speed, so that the probability of each CPU gaining access to memories A and A' is relatively equal among the CPUs of group A. Each first level arbitration circuit slows the propagation of the bus available signal only by the time required to propagate this signal through a high speed gating arrangement.

When two or more CPUs of duplex pairs of one subgroup smultaneously request access to memories A and A', a conflict situation arises. This conflict is arbitrated by means of the ring connection of first level arbitration circuits. The bus available signal propagates to the next sequential first level arbitration circuit of the subgroup. If that arbitration circuit has an active request for access to memories A and A', the CPU associated with this arbitration circuit is then given control of the buses enabling the duplex memory transfer to occur. If CPU 0' is the active one of the pair, the transfer will occur as above except that CPU 0 is replaced by CPU 0'.

During this time, the bus available signal is re-propagated to the next succeeding first level arbitration circuit pair 1 and 1' of each ring, so that CPUs 1 or 1' may establish priority as the next CPU to obtain access to the duplex resources A and A'. This arbitration occurs sequentially as described above until all outstanding requests within CPU group A have been serviced.

When a particular CPU has been granted access to memories A and A', the bus available signals will be re-propagated by each of its corresponding first level arbitration circuits. Other active CPUs will have the opportunity to establish a priority for service before a memory request will be granted to the same CPU. If the bus available signal returns to the first level arbitration circuit presently in control of the memory, a grant signal will automatically pass control of the grant of access to the next sequential first level arbitration circuit. Thereby, a particular CPU does not utilize its arbitration circuit to monopolize access to memories A and A'.

When two CPUs of duplex pairs located in different subgroups of group A, for example CPU 0 and CPU 16, simultaneously request access to the memories A and A', arbitration of this conflict is resolved by subgroup switching circuits A and A'. Switching circuits A and A' synchronously operate to select CPU 0 or 16 randomly and then alternates access to memories A and A' from one subgroup to the other subgroup, for example first CPU 0, next CPU 16, next CPU 1, next CPU 17, etc. The order within a subgroup need not be sequential. If only one CPU is requesting, switching circuits A and A' simply allocate memories A and A' to that CPU. When switching circuits A and A' must choose between CPUs of different subgroups, the initial choice is established by a periodic pulse input signal selecting one group. Access is then alternately allocated between groups.

However, optionally a CPU may lockout all other CPUs for more than one memory cycle. Such conditions are limited and closely monitored.

Figure 3:
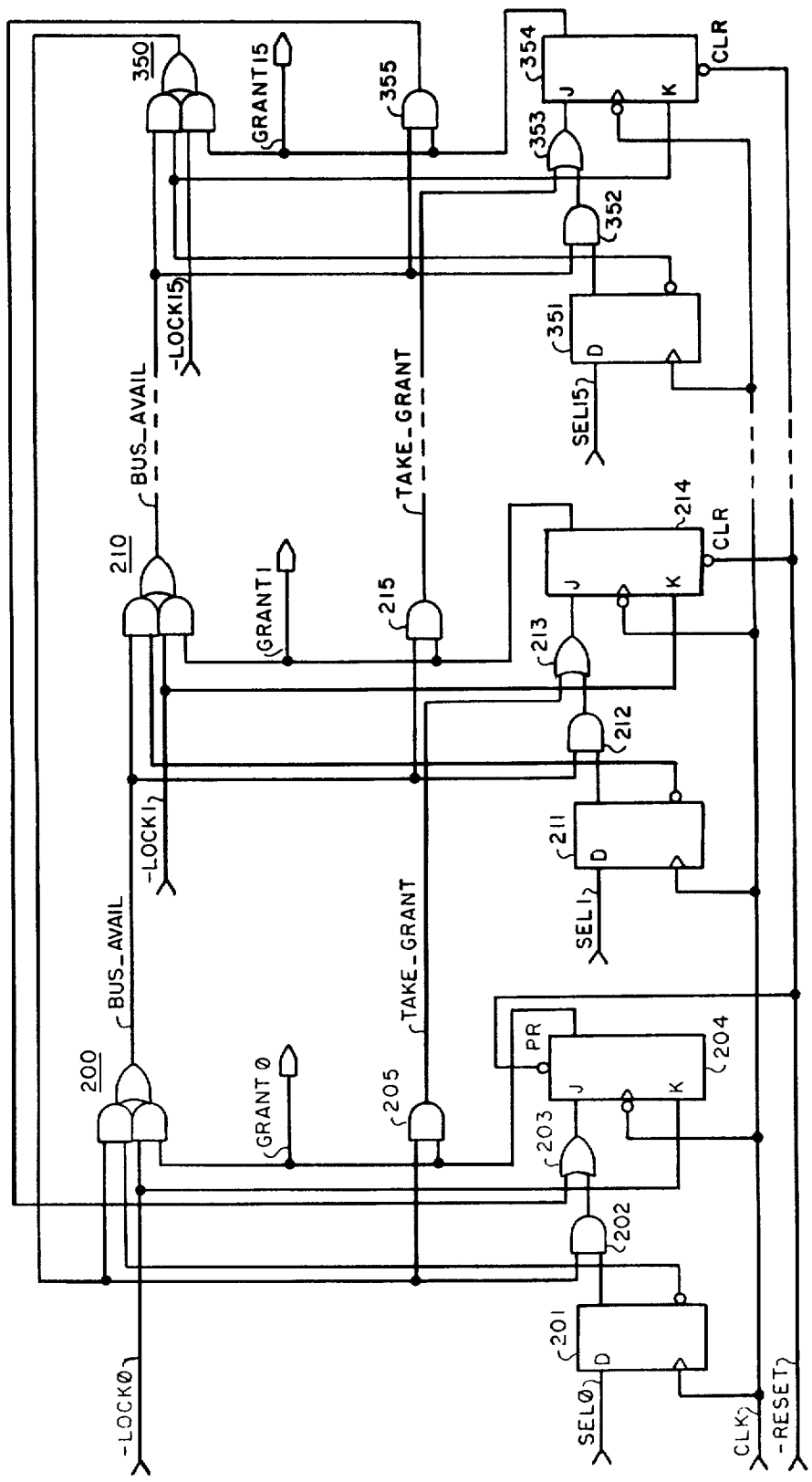
FIG. 3 is a schematic diagram embodying of the principles of operation of first level arbitration circuits as shown by FIGS. 1 and 2A and 2B.

Referring now to FIG. 3, a schematic diagram of three first level arbitration circuits of one subgroup is shown of a particular group. These circuits correspond to a first, a second and a last first level arbitration circuit. A particular implementation may include up to 16 pairs of arbitration circuits per subgroup, one pair for each CPU pair equipped in the configuration. Thereby, a maximum configuration of 32 pairs CPUs and 32 pairs of first level arbitration circuits is possible.

The operation will be explained for one arbitration subgroup or ring connection for simplicity. It is to be noted the same operation synchronously occurs in a corresponding parallel arbitration group. That is, arbitration circuits 0-15 and 0'-15' operate synchronously forming duplex subgroups. In addition, arbitration circuit 16-31 and 16'-31' operate synchronously forming another pair of duplex subgroups. Thereby, both memory copies A and A' are written to or read from simultaneously. In the operation either CPU of the pair may be active, for example, CPU 0 and 0' and 16 or 16'. In addition, this operation occurs for each group A, B and C. Any CPU may access any duplicate memories A and A', B and B' or C and C'.

The following description of first level arbitrations circuits of one subgroup of a particular group will be understood to apply to the synchronously operated duplex mate of the pair of arbitration circuits and also to the arbitration circuits of the other groups.

Each first level arbitration circuit includes a gating arrangement composed of an AND-OR gate 200, which may be implemented via an integrated circuit part number 74S51 or similar device. A circular ring connection of gates 200, 210, etc. propagates the bus-avail signal from one arbitration circuit to the next at a relatively high rate of speed so that the signal is not inhibited by any single arbitration circuit for a substantial period of time.

D-Type flip-flop 201, 211 and 351 are each connected between a respective CPU and its respective arbitration logic. Gates 201, etc. may be implemented via integrated circuit part number 74S74. JK flip-flop 204, 214, etc. are each connected between their corresponding D-type flip-flops 201, 211, etc. and their corresponding AND-OR gate 200, 210, etc.

As a portion of the system clear and initialization, CPU 0 or CPU 16 pulses the reset lead which is connected to JK flip-flops 204, 214, etc. As a result the bus-avail signal is generated through AND-OR gate 200 and propagates along the ring connection to AND-OR gate 210, 350 and back again to gate 200. A 12 MHZ clock signal, from a clock (not shown), is transmitted to all flip-flops (D-type and JK) via the CLK lead to operate each of these flip-flops.

An example will best serve to illustrate the granting of control of the common bus to a particular CPU. When, for example, CPU 0 signals via the reset lead, flip-flop 204 is preset enabling gate 200 to transmit the bus available signal via the bus-avail lead to each successive gate 210, etc. When CPU 0 requests access to the common memory, CPU 0 raises the SEL0 lead via the bus connected between CPU 0 and arbitration circuit 0. At the next clock cycle, the clock signal via the CLK lead is transmitted to flip-flop 201 which becomes set and the Q output of this flip-flop temporarily disables gate 200 from further passing the bus-avail signal. The Q output of flip-flop 201 is passed through gates 202 and 203 and sets flip-flop 204, which causes it to toggle and produce a signal on the grant 0 lead and simultaneously enables gate 205. The grant 0 lead is returned to CPUs 0 and this signal also enables tri-state elements (not shown), gating CPU 0 bus onto the bus of memory A. While this memory access takes place, the bus available signal is re-propagated via the output of JK flip-flop 204 through the lower portion of gate 200, so that the successive arbitration circuits may establish their respective priority for the memory access.

If the bus available signal returns to arbitration circuit 0 via the bus-avail lead while the access is in progress, the grant signal is transmitted via the take-grant lead automatically to the next sequential arbitration circuit 1, so that if SEL1 is set, CPU 1 access requests will be given the grant on the next clock cycle. This scheme distributes determination of which is the next available memory request to be given access on a rotational basis; and this scheme further keeps memory access equal when CPU access requests are sporadic. In this way, a CPU may not make successive memory requests.

CPU 0 may now completes its data transfer to memory A. If another arbitration circuit has established its priority, that arbitration circuit will receive control of the common bus next. In this way, while one CPU is accessing memory, the next CPU is establishing its priority for service.

All buses are bidirectional and each directional link includes tri-state bus drivers which may be implemented via integrated circuit part number 74LS245. All above mentioned integrated circuits are manufactured by Texas Instruments Incorporated and various other manufacturers.

The CPU having the memory access grant may signal via the lock lead (normally high) to halt the re-propagation of the bus available signal and thereby hold memory access for longer than one cycle. This optional use is a rare circumstance and is closely monitored by the CPUs.

Figure 4:
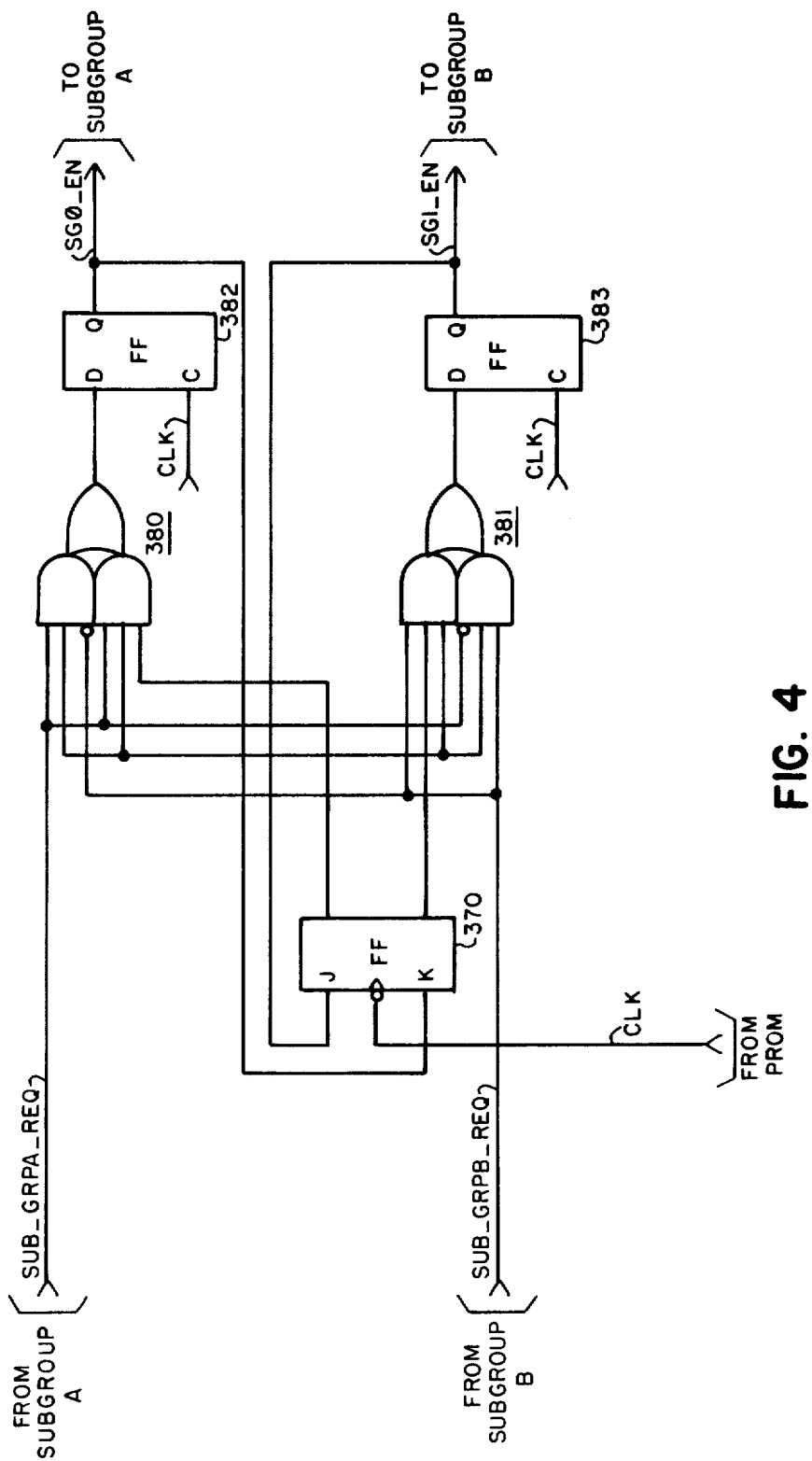
FIG. 4 is a schematic diagram of a subgroup switching circuit as shown in FIGS. 2A and 2B.

Referring to FIG. 4, a schematic diagram of subgroup switching circuits A and A' of FIG. 2A is shown. Subgroup switching circuit A' operates synchronously with switching circuit A. The other group's switching circuits B-B' and C-C' operate in a similar fashion. J-K flip-flop 370 is connected via the CLK lead to clock (not shown) providing an 12 MHZ cycle clock signal, flip-flop 370 is further connected to each of AND-OR gates 380 and 381 and OR gate 390. If, for example, a CPU of subgroup A is the only one requesting, the upper and gate of gate 380 is enabled and the CPU of subgroup A has its tri-state bus (not shown) enabled to access memory A.

When two CPUs one from each subgroup, simultaneously request access to the memory, the upper portion of gate 380 and lower portion of gate 381 are disabled. On the next clock cycle via the CLK lead, flip-flop 370 will toggle to enable the lower portion of gate 380 or the upper portion of gate 381, thereby selecting subgroup A or B respectively. Only one subgroup is enabled to access memory and on the next clock cycle the remaining subgroup is enabled.

Figure 5:
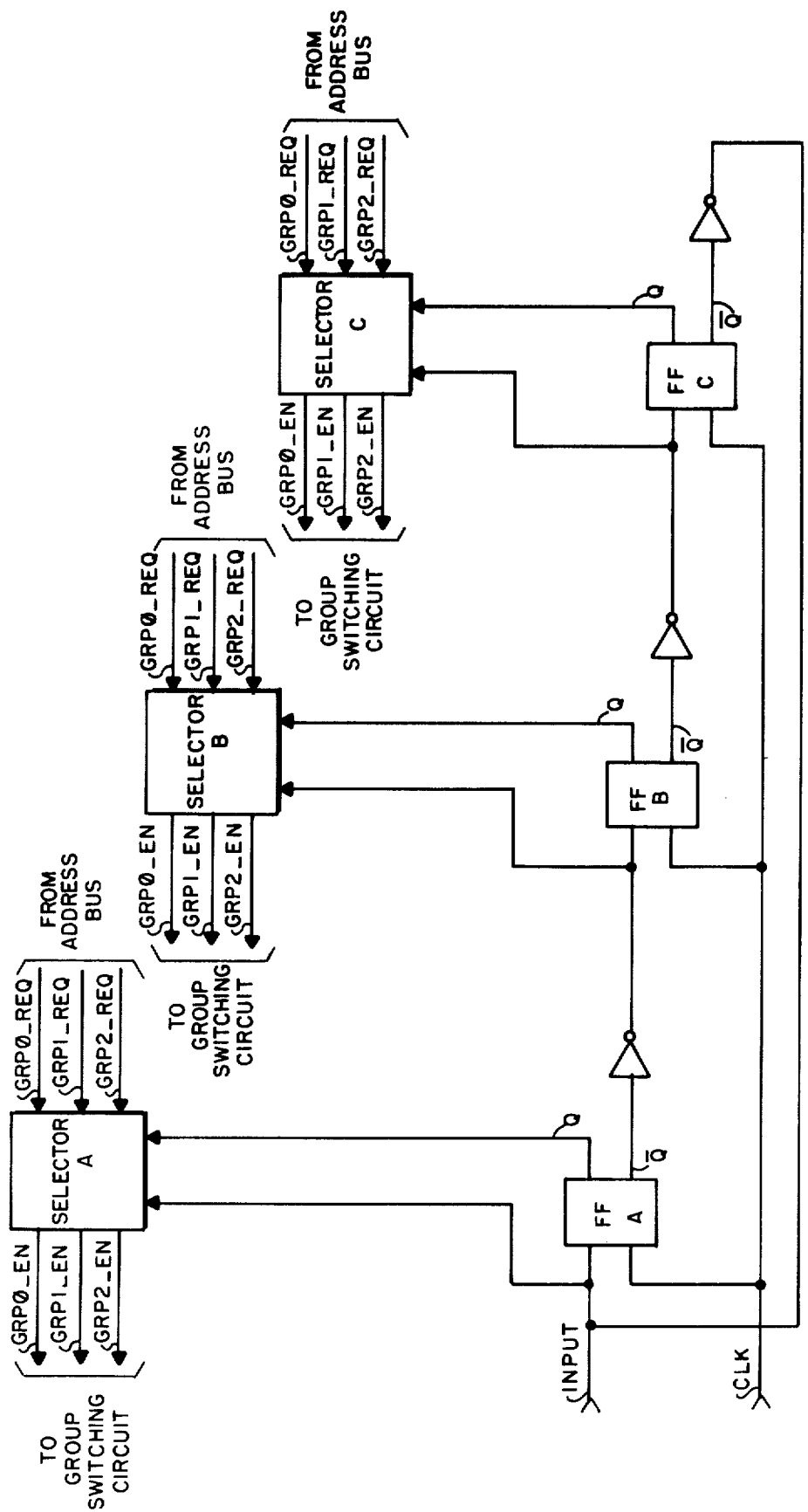
FIG. 5 is a schematic diagram of the second level arbitration circuits as shown in FIG. 1.

Referring now to FIG. 5, second level arbitration circuits 0-2 are shown. For simplicity, the operation of second level arbitration circuits 0, 1 and 2 will be described. It should be noted that second level arbitration circuits 0', 1' and 2' operate synchronously, as do arbitration circuits 0, 1 and 2. The second level arbitration circuit 0 of FIG. 1 includes selector A and flip-flop A as shown in FIG. 5. Second level arbitration circuit 1 includes selector B and flip-flop B and second level arbitration circuit 2 includes selector C and flip-flop C. Each second level arbitration circuit is ultimately connected to each subgroup switching circuit.

When only one subgroup of a group has a request, it is assigned control of the bus and corresponding memory as described above. However, when subgroups of more than one group have competing requests for memory, at each cycle of the system clock a pulse is transmitted on the CLK lead to each of the flip-flops A, B and C. When the system is initializated CPU 0 pulses the INPUT lead of flip-flop A. Thereby, the Q output of flip-flop A takes on the value logic "1". If the input and Q output of flip-flop A are considered together the resulting bit pattern will be seen to be a "01", this is the highest priority bit pattern. The second level arbitration circuit having the bit pattern "01" will be allowed access to any of the systems memory units A-C. That is, in response to a request from group 0, selector A will recognize that it is the highest priority and thereby, grant the group 0 enable signal to the subgroup switching circuit. The subgroup switching circuit will then give a subgroup enable to either subgroup 0 or subgroup 1 as described above.

At the next clock cycle the CLK lead is pulsed and flip-flop B now has a pulse supplied to its input and as a result its Q output becomes logic "1". Therefore looking at its input and output leads respectively the bit pattern "01" is seen by selector B and therefore second level arbitration circuit 1 is not the highest priority. At the same time, flip-flop A has now taken on the value logic "00" and flip-flop C has taken on the value of logic "10". One of the subgroups associated with group 1 will now be allowed priority to access one of the memory units group 2 has the next priority and group 0 now has the lowest priority. At each clock cycle the priority will shift rotationally as described above. That is, on the next clock cycle group 2 will become highest priority, group 0 will become the next priority and group 1 will become the lowest priority.

Selectors A, A', B, B', C and C' may comprise integrated circuits part number 74S153 manufactured by the Texas Instruments Corporation.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An allocation controller providing for equal priority sharing of multiple duplicate copy resources by active ones of duplicated pairs of a plurality of, CPUs said allocation controller comprising:

said plurality of CPUs including first, second and third groups each group including first and second portions;

at least three resources each having two duplicate copies, each to be selectively connected to any CPU of said plurality;

first arbitration means including first, second and third duplicated groups, each duplicated group of first arbitration means connected to a corresponding group of CPUs;

said first arbitration means operated in response to resource request signals from said plurality of CPUs to provide for selection of one CPU per CPU group;

a plurality of CPU buses including first, second and third groups corresponding to said CPU groups, each bus connected between a particular CPU and said first arbitration means, each CPU bus including a control portion and an address/data portion;

at least three pair of group buses, each bus pair corresponding to one said CPU group and said corresponding CPU buses, and each group bus connected between a particular CPU through said corresponding CPU bus via said first arbitration means and connected to one copy of said duplicate copy resources via one said group bus, each group bus further connected to said other group buses of said corresponding groups;

one group bus of each said pair further connected to a first copy of said duplicate copy resources and another group bus of each said pair further connected to a second copy of said duplicate copy resources;

second arbitration means connected between each of said duplicate copy resources and each group of first arbitration means and said second arbitration means operated in response to said operation of said first arbitration means to select one of said requesting CPUs of said different CPU groups for connection to said first and said second copies of one selected duplicate copy resource via one said pair of group buses and said corresponding CPU buses;

said group bus pair connected to said requesting CPU via said corresponding CPU bus through said first arbitration means and said second arbitration means and connected to said duplicate copy resources to establish bus connection between said one selected CPU and said selected duplicate copy resources for the transmission of data to and from said resources; and each of said second arbitration circuits operated on a rotational basis to allocate access of said selected duplicate copy resources to said requesting CPU.

2. An allocation controller as claimed in claim 1, wherein each duplex group of said first arbitration means includes a first and a second portion, each portion including:

means for initialization providing a first signal;

a plurality of first arbitration circuits including an initial, at least one successive and a last first arbitration circuit, each arbitration circuit connected to a corresponding CPU;

said means for initialization connected to at least one of said first arbitration circuits; and each of said first arbitration circuits operated in response to said first signal and to said resource request signal from said corresponding CPU to produce a second signal for allowing one of said plurality of CPUs access to a particular common resource.

3. An allocation controller as claimed in claim 2, wherein:
corresponding first arbitration circuits of said first and second portion of each group of first arbitration means are connected whereby said corresponding first arbitration circuits operate synchronously.

4. An allocation controller as claimed in claim 2, wherein said first arbitration means further includes:
a plurality of circuit connections including a circuit connection between said initial first arbitration circuit and each successive first arbitration circuit, said last first arbitration circuit connected to said initial first arbitration circuit, thereby forming a completed ring connection for propagating said first signal from one arbitration circuit to another arbitration circuit in a circular fashion.

5. An allocation controller as claimed in claim 4, wherein: each of said first arbitration circuits includes first gating means connected to said successive arbitration circuit and operated to propagate said first signal along said ring connection at a relatively high rate of speed whereby each CPU is given an equal priority access to said resource by inhibiting said propagation of said first signal.

6. An allocation controller as claimed in claim 5, wherein: each of said first arbitration circuits includes second gating means connected to said successive arbitration circuit of said ring connection and operated to propagate a third signal from each arbitration circuit to each successive arbitration circuit, whereby control of said common resource is given to said next successive arbitration circuit having said resource request signal from its corresponding CPU.

7. An allocation controller as claimed in claim 6, wherein: said second gating means is further connected to said corresponding CPU whereby said corresponding CPU exclusively controls access to said common resource.

8. An allocation controller as claimed in claim 6, wherein: each of said first arbitration circuits includes latching means connected to said corresponding CPU and operated in response to said resource request signal of said corresponding CPU to produce said second signal allowing said CPU to access said resource.

9. An allocation controller as claimed in claim 8, whereino: said latching means includes first and second flip-flops, said first flip-flop connected between said corresponding CPU and said second flip-flop, said second flip-flop connected to said first and said second gating means of said corresponding first arbitration circuit, whereby said resource request signal of said corresponding CPU is stored for arbitration.

10. An allocation controller as claimed in claim 6, wherein said second arbitration means includes duplicate first and second portions, each portion including:
a plurality of second arbitration circuits having an initial, an intermediate and a final second arbitration circuit; and
said initial second arbitration circuit connected to said intermediate second arbitration circuit, said intermediate second arbitration circuit connected to said final second arbitration circuit and said final second arbitration circuit connected to said initial second arbitration circuit whereby a priority status indicator is circularly transmitted between each second arbitration circuit allowing said selected CPU of said second arbitration circuit having priority status to access one of said resources.

11. An allocation controller as claimed in claim 10, wherein each of said second arbitration circuits includes:
a first input connection for receiving an initialization signal;
a second input connection for receiving a clock signal;
latching means connected to said first and second input connections and operated in response to said initialization signal and to said clock signal to produce a fourth and a fifth signal; and
selection means connected to said latching means and operated in response to a predetermined value of said fourth and fifth signals to provide a sixth signal for enabling connection of said requesting CPU to said resource via said corresponding bus.

12. An allocation controller as claimed in claim 10, wherein each said portion includes:
said initial second arbitration circuit connected via a bus to said intermediate second arbitration circuit;
said intermediate second arbitration circuit connected via a bus to said last second arbitration circuit;
said final second arbitration circuit connected via a bus to said initial second arbitration circuit whereby each said requesting CPU is connected to said requested one duplicate copy of said resources.

13. An allocation controller as claimed in claim 10, wherein:
corresponding second arbitration circuits of said first and second portions of said second arbitration means are connected whereby, said corresponding second arbitration circuits operate synchronously.

14. An allocation controller as claimed in claim 1, wherein there is further included:
switching means connected between said first and said second arbitration means and operated in response to said resource request of said requesting CPUs to select one CPU of two simultaneously requesting CPUs of two different of said CPU groups; and
said switching means further operated to alternately select said CPUs of said group whereby allocation of said common resource is approximately equal among said CPUs of each group.

15. An allocation controller as claimed in claim 14, wherein said switching means includes a first and a second portion, each portion including:
connections to first and to second subgroups of CPUs;
a first switching circuit connected between said first group of first arbitration means and said second arbitration means;
a second switching circuit connected between said second group of first arbitration means and said second arbitration means;
a third switching circuit connected between said third group of first arbitration means and said second arbitration means whereby one of said requesting CPUs is selected for each group of first arbitration means.

16. An allocation controller as claimed in claim 15, wherein:

corresponding switching circuits of said first and second portions are connected whereby said corresponding switching circuits operate synchronously.

17. An allocation controller as claimed in claim 15, wherein each said switching circuit includes:
- a flip-flop;
- a first latch connected to a first subgroup of CPUs of said corresponding CPU group and to said flip-flop;
- a second latch connected to a second subgroup of CPUs of said corresponding CPU and to said flip-flop; and
- gating means connected between said flip-flop and said first and second latches, and said gating means operated in response to said simultaneous resource request signals of said first arbitration means to select a CPU of said first subgroup and alternately to select CPU of said second subgroup.

18. An arbitration controller as claimed in claim 1, wherein: each of said duplicte pairs of CPUs includes a first and a second CPU cross connection bus, said first cross connection bus connected between said first CPU of said pair and said second bus and said second cross connection bus connected between said second CPU of said pair and said first cross connection bus whereby said first CPU constitutes said active CPU and said second CPU constitutes a ready-standby CPU and alternatively said second CPU constitutes said active CPU and said first CPU constitutes a ready-standby CPU.

19. An arbitration controller as claimed in claim 1, wherein: said two duplicate copies of said duplicate copy resources are interconnected whereby each of said active CPUs access both said duplicate copies of said selected resource synchronously.

* * * * *